(12) United States Patent
Zhuang et al.

(10) Patent No.: US 11,347,959 B2
(45) Date of Patent: May 31, 2022

(54) CLASSIFICATION METHOD FOR AUTOMATICALLY IDENTIFYING WAFER SPATIAL PATTERN DISTRIBUTION

(71) Applicant: Shanghai Huali Microelectronics Corporation, Shanghai (CN)

(72) Inventors: Junjun Zhuang, Shanghai (CN); Xu Chen, Shanghai (CN)

(73) Assignee: Shanghai Huali Microelectronics Corporation, Shanghai (CN)

(*) Notice: Subject to any disclaimer, the term of this patent is extended or adjusted under 35 U.S.C. 154(b) by 448 days.

(21) Appl. No.: 16/690,470

(22) Filed: Nov. 21, 2019

(65) Prior Publication Data

US 2021/0056305 A1 Feb. 25, 2021

(30) Foreign Application Priority Data

Aug. 19, 2019 (CN) .......................... 201910762998.1

(51) Int. Cl.
| | |
|---|---|
| *G06K 9/00* | (2022.01) |
| *G06K 9/62* | (2022.01) |
| *G06N 3/04* | (2006.01) |
| *G01B 21/20* | (2006.01) |
| *G06N 3/08* | (2006.01) |

(52) U.S. Cl.
CPC ....... *G06K 9/00536* (2013.01); *G06K 9/0051* (2013.01); *G06K 9/00523* (2013.01); *G06K 9/6218* (2013.01); *G06N 3/04* (2013.01); *G01B 21/20* (2013.01); *G06N 3/08* (2013.01)

(58) Field of Classification Search
CPC ............. G06K 9/00536; G06K 9/0051; G06K 9/00523; G06K 9/6218; G06K 9/6273; G06K 9/6268; G06N 3/04; G06N 3/08; G06N 3/0454; G01B 21/20; G06V 10/82; G06V 2201/06; G06V 10/30; G06V 10/40; G06T 5/002; G06T 2207/30148; G06T 7/0004

See application file for complete search history.

(56) References Cited

U.S. PATENT DOCUMENTS

| | | | | |
|---|---|---|---|---|
| 5,649,169 A | * | 7/1997 | Berezin .............. | G01N 21/9501 700/110 |
| 5,982,920 A | * | 11/1999 | Tobin, Jr. .............. | G06T 7/0004 382/145 |

(Continued)

*Primary Examiner* — Christopher M Brandt
(74) *Attorney, Agent, or Firm* — Banner & Witcoff, Ltd.

(57) ABSTRACT

The present invention provides a classification method for automatically identifying wafer spatial pattern distribution, comprising the following steps: performing statistical analysis to distribution of defects on a wafer, the defects being divided into random defects, repeated defects and cluster defects; performing denoising and signal enhancement to the cluster defects; performing feature extraction to the cluster defects after denoising and signal enhancement; and performing wafer spatial pattern distribution classification to the cluster defects after feature extraction. By performing statistical analysis and neural network training to a great amount of wafer defect distribution, the spatial patterns in defect distribution can be automatically identified, the automatic classification of wafer spatial patterns can be realized, the workload of engineers is effectively reduced and the tracing of the root cause of such spatial pattern is facilitated.

10 Claims, 4 Drawing Sheets

(56) References Cited

U.S. PATENT DOCUMENTS

| | | | |
|---|---|---|---|
| 9,964,607 B1* | 5/2018 | Propes | G06V 10/82 |
| 2009/0105990 A1* | 4/2009 | Shibuya | G01N 21/956 |
| | | | 702/183 |
| 2015/0051859 A1* | 2/2015 | Chien | G01R 31/2846 |
| | | | 702/81 |
| 2019/0072505 A1* | 3/2019 | Saraswatula | H01J 37/28 |
| 2019/0333208 A1* | 10/2019 | Asbag | G06K 9/628 |
| 2020/0226742 A1* | 7/2020 | Sawlani | H01L 21/67288 |

* cited by examiner

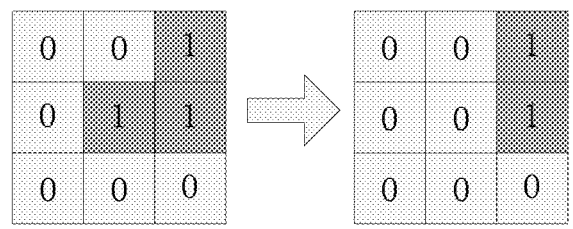
FIG. 4
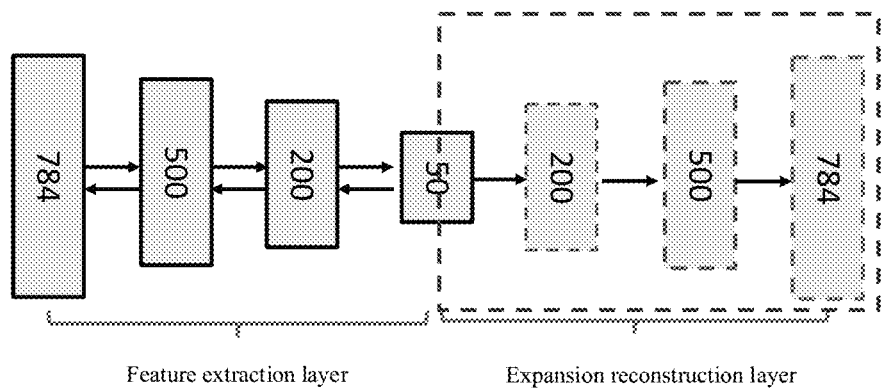
FIG. 5
| | | | | | | | | | |
|---|---|---|---|---|---|---|---|---|---|
| $N_{gg}$ | 16742 | 23542 | 23649 | 24712 | 27799 | 24561 | 27473 | 28103 | 28094 |
| $N_{bb}$ | 1818 | 1493 | 3579 | 1150 | 76 | 2175 | 322 | 125 | 5 |
| $N_{bg}$ | 5408 | 2231 | 971 | 1799 | 799 | 1360 | 831 | 609 | 650 |
| $N_{gb}$ | 5406 | 2190 | 1175 | 1802 | 782 | 1360 | 830 | 619 | 625 |
| $Log\zeta$ | 0.040 | 1.9731 | 4.306 | 2.171 | 1.224 | 3.362 | 2.551 | 2.234 | -0.968 |
FIG. 6

FIG. 8b

CLASSIFICATION METHOD FOR AUTOMATICALLY IDENTIFYING WAFER SPATIAL PATTERN DISTRIBUTION

CROSS REFERENCE TO RELATED APPLICATIONS

The present application claims priority to and the benefit of Chinese Patent Application No. 201910762998.1 filed on Aug. 19, 2019, the disclosure of which is incorporated herein by reference in its entirety as part of the present application.

BACKGROUND

The present invention relates to the field of semiconductor manufacturing, in particular to a classification method for automatically identifying wafer spatial pattern distribution.

In the manufacturing process of wafers, due to different reasons, different defect distributions will be caused. The bin and SP distribution will be tested by a wafer probe. The classification and analysis of wafer spatial patterns can trace and check the online measurement recipe, process and machine abnormalities, as well as improve the product yield. However, the current identification and classification of wafer spatial patterns are based on the artificial judgment of engineers, which is inefficient and easily confused. For example, a testing machine scans thousands of wafers every day, for wafers of which the measured results not exceeding a specific value, engineers need to manually screen out these wafer patterns to judge whether there are spatial patterns to make sure there are no case be neglected, such that the load of the engineers is heavy and the efficiency is low.

Therefore, it is necessary to provide a new method to solve the above problems.

BRIEF SUMMARY

In view of the above disadvantages in the prior art, the purpose of the present invention is to provide a classification method for automatically identifying wafer spatial pattern distributions, which is used for solving the problems that the eyeball analysis is time-consuming because a mass of wafers need to be artificially judged whether spatial patterns exist or not in the prior art.

In order to realize the above purpose and other related purposes, the present invention provides a classification method for automatically identifying wafer spatial pattern distribution. The method comprises the following steps: step 1: performing statistical analysis to the distribution of defects on a wafer, and the defects being divided into random defects, repeated defects and cluster defects; step 2: performing denoising and signal enhancement to the cluster defects; step 3: performing feature extraction to the cluster defects after denoising and signal enhancement; and step 4: performing wafer spatial pattern classification to the cluster defects after feature extraction.

Preferably, in step 1, the statistical analysis is performed to the distribution of the defects on the wafer through an odds ratio hypothesis-testing method.

Preferably, in step 2, the denoising and signal enhancement are performed to the cluster defects according to a cellular automata thinking.

Preferably, in step 2, the denoising and signal enhancement are performed to the cluster defects according to the cellular automata thinking to remove the random defects.

Preferably, in step 3, the feature extraction is performed to the cluster defects by means of reconstruction by using a neural network.

Preferably, in step 4, the wafer spatial pattern classification is performed to the cluster defects after feature extraction by using a clustering algorithm.

Preferably, in step 2, a method for performing the denoising and signal enhancement to the cluster defects according to the cellular automata thinking to remove the random defects comprises: when the test fail rate of wafers that are classified as random defect, reaches more than 95%, performing the feature extraction in step 3.

Preferably, in step 1, when the statistical analysis is performed to the distribution of the defects on the wafer through the odds ratio hypothesis-testing method, data pre-processing is firstly performed to the defect distribution to generate a binary pattern, and then spatial randomness calculation is performed.

Preferably, in step 1, when the statistical analysis is performed to the distribution of the defects on the wafer through the odds ratio hypothesis-testing method, hypothesis-testing is performed to each die of each wafer according to random defects, repeated defects and cluster defects.

Preferably, a field is defined by dies within a 3*3 matrix range around a certain die on each wafer; and whether a die needs to be subjected to denoising or signal enhancement is determined by performing ineffectiveness judgment to the die in the field in step 2.

As described above, the classification method for automatically identifying wafer spatial pattern distribution provided by the present invention has the following beneficial effects: by performing statistical analysis and neural network training to a great amount of wafer defect distribution, the spatial patterns in defect distribution can be automatically identified, the automatic classification of wafer spatial patterns can be realized, the loading of engineers is effectively reduced and the tracing of the root cause of such spatial pattern is facilitated.

BRIEF DESCRIPTION OF THE DRAWINGS

FIG. 4 illustrates a schematic diagram of ineffective-to-effective conversion of a central die in a die field according to the present invention.

FIG. 5 illustrates a schematic diagram of a neural network model established in the present invention.

FIG. 6 illustrates a schematic diagram of spatial randomness calculation results according to the present invention.

FIG. 8b illustrates a schematic diagram of results of clustering performed to wafer defect distribution through a neural network according to the present invention.

DETAILED DESCRIPTION

The embodiments of the present invention will be described below through specific examples, and one skilled in the art can easily understand other advantages and effects of the present invention according to the contents disclosed in the description. The present invention may also be implemented or applied by means of other different specific embodiments, and the details in the description may also be modified or changed without departing from the spirit of the present invention based on different viewpoints and applications.

Please refer to FIG. 1 to FIG. 8b. It should be noted that the drawings provided in the embodiments are only used for schematically describing the basic concept of the present invention, only illustrate the components related to the present invention, and are not drawn according to the number, shape and size of the components during actual implementation. The configuration, number and scale of each component during actual implementation may be freely changed, and the layout configuration of the component may be more complex.

Figure 1:
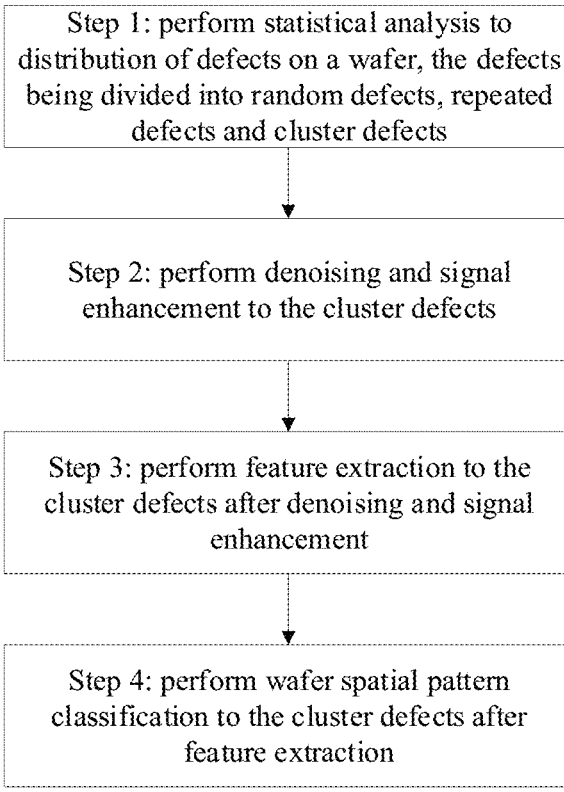
FIG. 1 illustrates a flowchart of a classification method for automatically identifying wafer spatial pattern distribution according to the present invention.

The present invention provides a classification method for automatically identifying wafer spatial pattern distribution. As illustrated in FIG. 1, it illustrates a flowchart of a classification method for automatically identifying wafer spatial pattern distribution according to the present invention. The method comprises the following steps:

In step 1, statistical analysis is performed to distribution of defects on a wafer. The defects are divided into random defects, repeated defects and cluster defects. In the present embodiment, the data are pulled from a background database to generate a distribution diagram of wafer defects. Preferably, in step 1, the statistical analysis is performed to the distribution of the defects on the wafer through an odds ratio hypothesis-testing method.

Further, in step 1, when the statistical analysis is performed to the distribution of the defects on the wafer through the odds ratio hypothesis-testing method, data preprocessing is firstly performed to the defect distribution to generate a binary pattern, and then spatial randomness calculation is performed. In the present embodiment, when the statistical analysis is performed to the distribution of the defects on the wafer through the odds ratio hypothesis-testing method, hypothesis-testing is performed to each die of each wafer according to random defects, repeated defects and cluster defects. The die on the wafer is a chip with complete functions cut from the wafer. Taking FIG. 2 as an example, a small square block represents a die.

Figure 2:
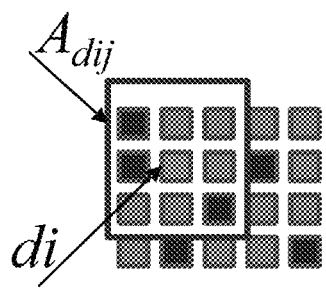
FIG. 2 illustrates a schematic diagram of dies in a field according to the present invention.

The odds ratio hypothesis-testing in this step is as follows: firstly, hypothesis-testing is performed to each die on each wafer. A field is defined by dies within a 3*3 matrix range around a certain die on each wafer. As illustrated in FIG. 2, it illustrates a schematic diagram of dies in a field according to the present invention. In the field, eight dies around the central die and the central die (the die in the solid line box in FIG. 2) form the field.

Herein, di represents the ith die on the wafer; Adij represents the field formed by the ith die 3*3 matrix, where $1<=j<=9$; Yi represents the effectiveness or ineffectiveness of the ith die, if the ith die is effective, then Yi=0, otherwise Yi=1; Yj represents the effectiveness or ineffectiveness of the jth die in the field formed by taking the ith die as the center, if the jth die is effective, then Yj=0, otherwise Yj=1.

Ngg, Ngb, Nbg and Nbb are four different statistical values, as illustrated in the following table,

| i | j | |
|---|---|---|
| | Effective | Ineffective |
| Effective | Ngg | Ngb |
| Ineffective | Nbg | Nbb |

If the ith die is effective, the dies in the field are traversed, and if the die is an effective die, Ngg is 1; if the die is an ineffective die, Ngb is 1; if the ith die is an ineffective die, the dies in the field are traversed, and if the die is an effective die, Nbg is 1; if the die is an ineffective die, Nbb is 1; and statistic collection is performed to each die in the wafer. After the accumulation of Ngg, Nbb, Nbg and Ngb, the final value is obtained, namely:

$Ngg = \Sigma\Sigma\delta(1-Yi)(1-Yj);$ $Ngb = \Sigma\Sigma\delta(1-Yi)Yj;$ $Nbg = \pi\pi\delta Yi(1-Yj);$ $Nbb = \Sigma\Sigma\delta Yi Yj;$ Taking $$\zeta = \frac{Ngg * Nbb}{Ngb * Nbg},$$

if log $\zeta$=0, it is classified in random defect distribution; and if log $\zeta$>0, it is classified in cluster defect distribution; and if log $\zeta$<0, it is classified in repeated defect distribution. Referring to FIG. 6, it illustrates a schematic diagram of spatial randomness calculation results according to the present invention, wherein classification results corresponding to each value of Ngg, Nbb, Nbg, Ngb and log $\zeta$ are listed. From the distribution of the defects on the wafer, it can be seen that the defect distribution corresponding to log $\zeta$>0 is cluster defect distribution; and the defect distribution corresponding to log $\zeta$<0 is repeated defect distribution.

In step 2: denoising and signal enhancement are performed to the cluster defects. Further, in the present embodiment, in step 2, the denoising and signal enhancement are performed to the cluster defects according to a cellular automata thinking to remove the random defects.

Further, a method for performing the denoising and signal enhancement to the cluster defects according to the cellular automata thinking to remove the random defects comprises: when the ineffectiveness rate of the random defects reaches more than 95%, the feature extraction in step 3 is performed. Whether a die needs to be subjected to denoising or signal enhancement is determined by performing ineffectiveness judgment to the die in the field.

Figure 3:
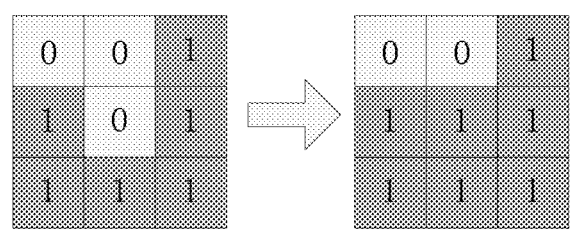
FIG. 3 illustrates a schematic diagram of effective-to-ineffective conversion of a central die in a die field according to the present invention.
Figure 7:
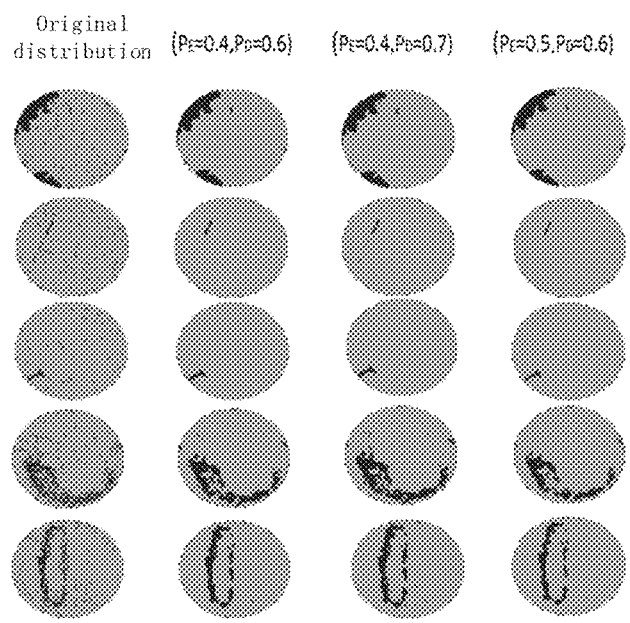
FIG. 7 illustrates a schematic diagram of results of denoising performed to cluster defects in the present invention.

In this step, the method for performing denoising and signal enhancement to the cluster defects is as follows: PE is used to represent the threshold value of signal enhancement, PD is used to represent the threshold value of denoising, as illustrated in FIG. 3 and FIG. 4, the quality (effectiveness and ineffectiveness) of each die and the die in the field is respectively and sequentially marked as 0 and 1, which can form a 3*3 yield matrix YAd, and T is the set weight matrix, can freely adjust the value of each element in the matrix and represents the degree of influence of the quality of each die in the field on the central die. Supposing that all weights in the field of the 3*3 matrix are the same, the sum is 1 and each element of T is ⅑, i.e.

$$T = \begin{bmatrix} 1/9 & 1/9 & 1/9 \\ 1/9 & 1/9 & 1/9 \\ 1/9 & 1/9 & 1/9 \end{bmatrix};$$

then we calculate the dot product of the weight matrix T and YAd. If the central die is an effective die, the Nenhance value is obtained; if the central die is an ineffective die, the Ndenoise value is obtained. The two values are compared with the set PE and PD respectively. If Nenhance>PE, the die is converted to an ineffective die; if Ndenoise>PD, the die is converted to an effective die. Referring to FIG. 3 and FIG. 4, FIG. 3 illustrates a schematic diagram of effective-to-ineffective conversion of a central die in a die field according to the present invention; FIG. 4 illustrates a schematic diagram of ineffective-to-effective conversion of a central die in a die field according to the present invention. As illustrated in FIG. 7, it illustrates a schematic diagram of results of denoising performed to cluster defects in the present invention.

Figure 8A:
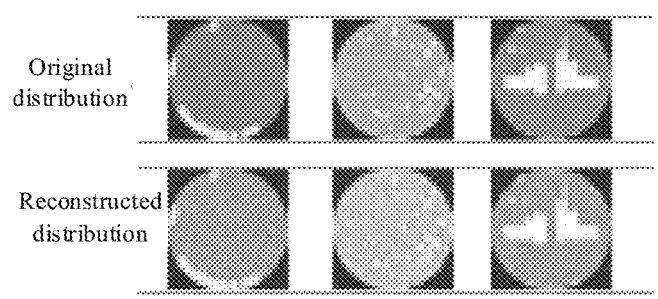
FIG. 8a illustrates a schematic diagram of results of reconstruction performed to wafer defect distribution through a neural network according to the present invention.

In step 3, feature extraction is performed to the cluster defects after denoising and signal enhancement. In this step, the feature extraction is performed to the cluster defects by means of reconstruction by using a neural network. As illustrated in FIG. 8a, it illustrates a schematic diagram of results of reconstruction performed to wafer defect distribution through a neural network according to the present invention.

The first line represents the original defect distribution; the second line represents the defect distribution after reconstruction. In the present embodiment, in this step, for the process of performing feature extraction to the cluster defects by means of reconstruction by using the neural network, refer to FIG. 5. FIG. 5 illustrates a schematic diagram of a neural network model established in the present invention, which is divided into a feature extraction layer and an expansion reconstruction layer, the dotted line box on the right side of FIG. 5 represents the expansion reconstruction layer and the left side represents the feature extraction layer.

Figure 8B:
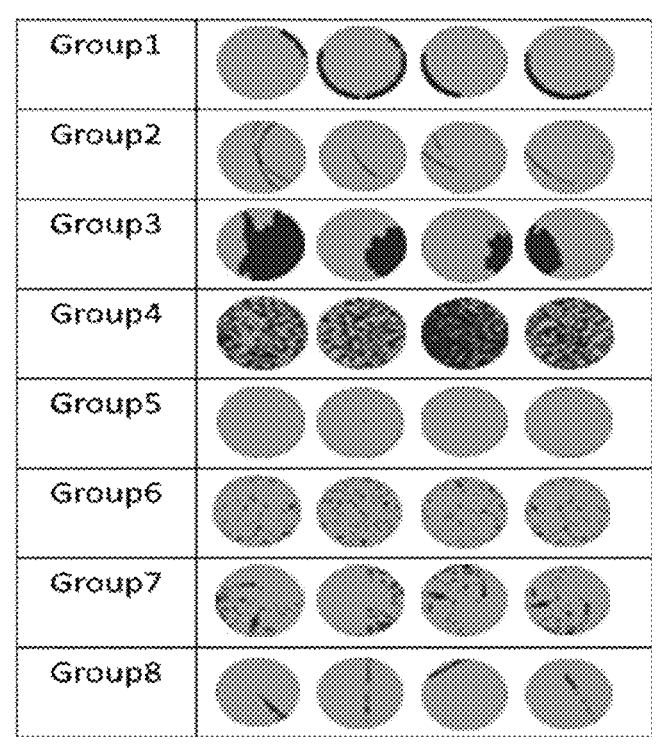

In step 4, wafer spatial pattern classification is performed to the cluster defects after feature extraction. Further, in step 4, the wafer spatial pattern classification is performed to the cluster defects after feature extraction by using a TSNE clustering algorithm. Referring to FIG. 8b, it illustrates a schematic diagram of results of clustering performed to wafer defect distribution through a neural network according to the present invention, wherein Group1 to group8 represent eight types of distribution after clustering. From FIG. 8b, it can be seen that each type of distribution is different. For example, compared with Group5 and Group6, the distribution of Group5 is obviously very sparse, while the distribution of Group6 is denser and uniform, and the distribution of Group7 is denser but uneven.

To sum up, by performing statistical analysis and neural network training to a great amount of wafer defect distribution, the spatial patterns in defect distribution can be automatically identified, the automatic classification of wafer spatial patterns can be realized, the workload of engineers is effectively reduced and the tracing of the root cause of such spatial pattern is facilitated. Therefore, the present invention overcomes various disadvantages in the prior art and has a great industrial utilization value.

The above embodiments are only used for exemplarily describing the principle and effects of the present invention instead of limiting the present invention. One skilled in the art may modify or change the above embodiments without departing from the spirit and scope of the present invention. Therefore, all equivalent modifications or changes made by one skilled in the art without departing from the spirit and technical concept disclosed by the present invention shall be covered by the claims of the present invention.

What is claimed is:

1. A classification method for automatically identifying wafer spatial pattern distribution, wherein the method comprises the following steps:
    step 1: performing statistical analysis to distribution of defects on a wafer, the defects being divided into random defects, repeated defects and cluster defects;
    step 2: performing denoising and signal enhancement to the cluster defects;
    step 3: performing feature extraction to the cluster defects after denoising and signal enhancement; and
    step 4: performing wafer spatial pattern classification to the cluster defects after feature extraction.

2. The classification method for automatically identifying wafer spatial pattern distribution according to claim 1, wherein in step 1, the statistical analysis is performed to the distribution of the defects on the wafer through an odds ratio hypothesis-testing method.

3. The classification method for automatically identifying wafer spatial pattern distribution according to claim 1, wherein in step 2, the denoising and signal enhancement are performed to the cluster defects according to a cellular automata thinking.

4. The classification method for automatically identifying wafer spatial pattern distribution according to claim 3, wherein in step 2, the denoising and signal enhancement are performed to the cluster defects according to the cellular automata thinking to remove the random defects.

5. The classification method for automatically identifying wafer spatial pattern distribution according to claim 1, wherein in step 3, the feature extraction is performed to the cluster defects by means of reconstruction by using a neural network.

6. The classification method for automatically identifying wafer spatial pattern distribution according to claim 1, wherein in step 4, the wafer spatial pattern classification is performed to the cluster defects after feature extraction by using a clustering algorithm.

7. The classification method for automatically identifying wafer spatial pattern distribution according to claim 4, wherein in step 2, a method for performing the denoising and signal enhancement to the cluster defects according to the cellular automata thinking to remove the random defects comprises: when the ineffectiveness rate of the random defects reaches more than 95%, performing the feature extraction in step 3.

8. The classification method for automatically identifying wafer spatial pattern distribution according to claim 2, wherein in step 1, when the statistical analysis is performed to the distribution of the defects on the wafer through the odds ratio hypothesis-testing method, data preprocessing is firstly performed to the defect distribution to generate a binary pattern, and then spatial randomness calculation is performed.

9. The classification method for automatically identifying wafer spatial pattern distribution according to claim 2, wherein in step 1, when the statistical analysis is performed to the distribution of the defects on the wafer through the odds ratio hypothesis-testing method, hypothesis-testing is performed to each die of each wafer according to random defects, repeated defects and cluster defects.

10. The classification method for automatically identifying wafer spatial pattern distribution according to claim 9, wherein a field is defined by dies within a 3*3 matrix range around a certain die on each wafer; and whether a die needs to be subjected to denoising or signal enhancement is determined by performing ineffectiveness judgment to the die in the field in step 2.

* * * * *